Figure 1:
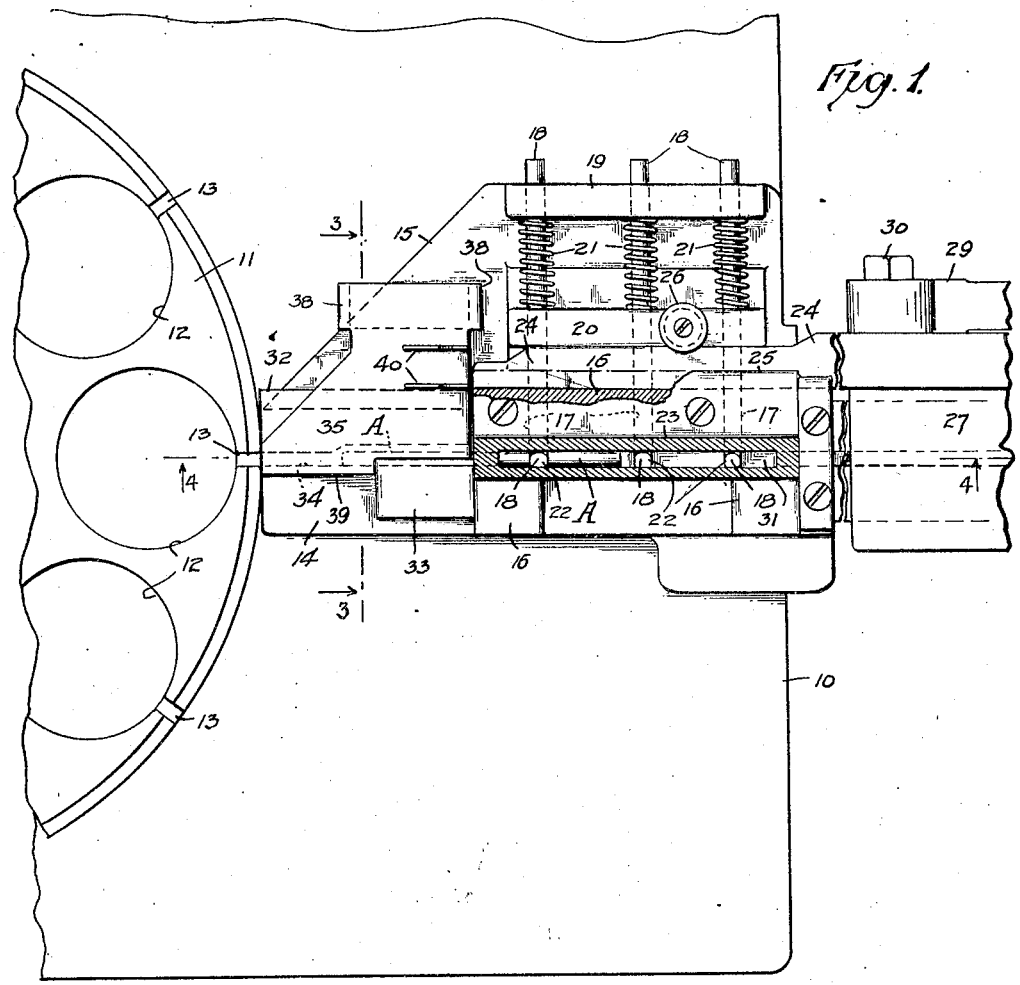

Aug. 3, 1926.

R. W. KROUT 1,594,418

STICK INSERTING MECHANISM FOR MACHINES USED IN THE
MANUFACTURE OF STICK CANDY

Filed July 16, 1925    2 Sheets-Sheet 1

Ray W. Krout
INVENTOR

BY
his ATTORNEY

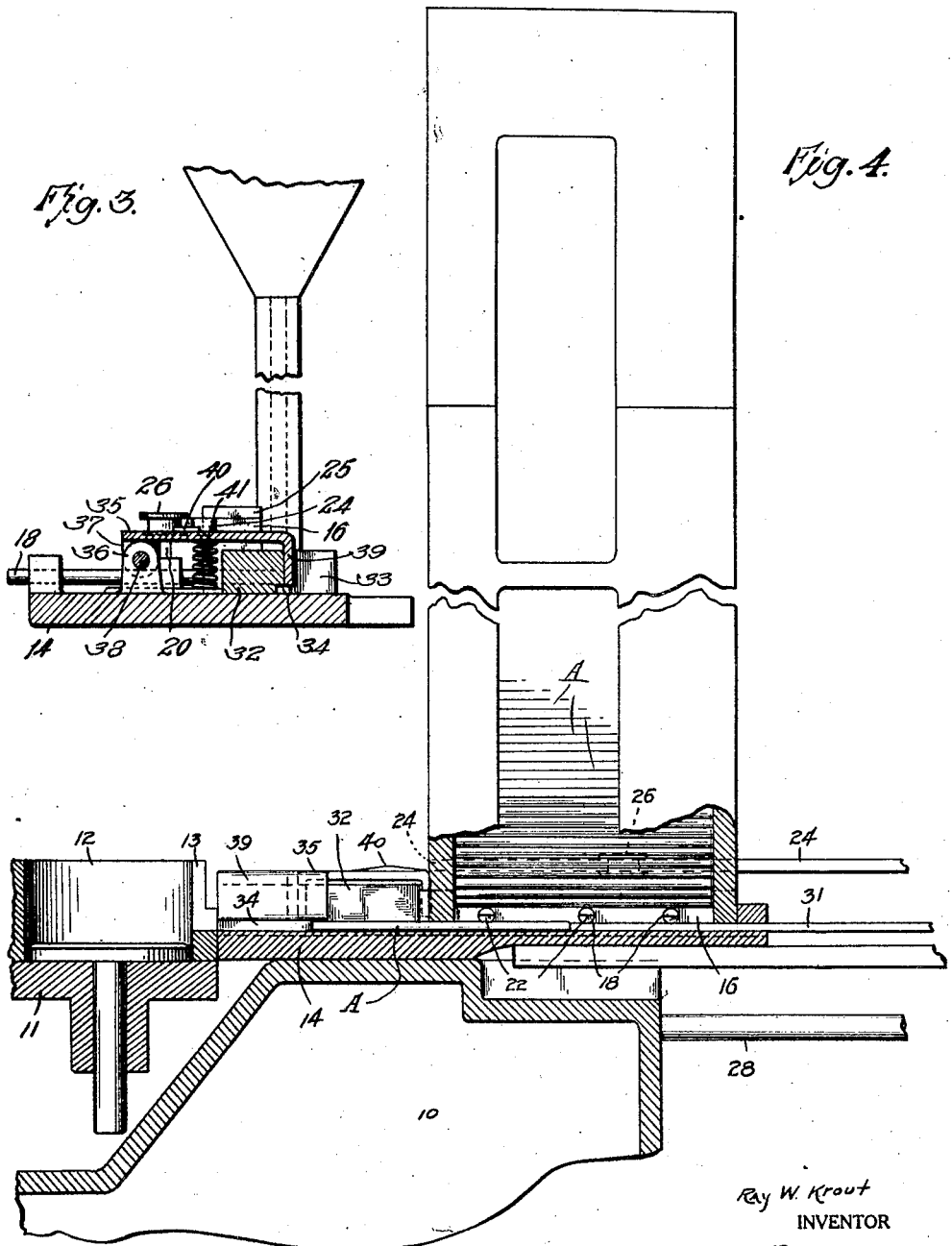

Patented Aug. 3, 1926.

1,594,418

UNITED STATES PATENT OFFICE.

RAY W. KROUT, OF NEWARK, NEW JERSEY, ASSIGNOR TO CHARMS COMPANY, OF NEWARK, NEW JERSEY, A CORPORATION OF DELAWARE.

STICK-INSERTING MECHANISM FOR MACHINES USED IN THE MANUFACTURE OF STICK CANDY.

Application filed July 16, 1925. Serial No. 43,938.

This invention relates to improvements in stick inserting mechanism for machines used in the manufacture of lollypops or sucker candy, i. e. a formed disc of candy material having a stick projecting from the edge thereof, and the invention pertains more particularly to means for guiding the stick in its projection into the candy and for moving the guide out of the path of the same stick as the latter travels with the candy disc to the next stage in the operation of the machine.

The specific type of stick candy machine to which the present invention is applicable comprises, briefly, a circular intermittently rotating table having die molds disposed therein to receive separate pieces of candy material in a plastic condition; and a plunger, which descends into each mold, as the molds move thereunder, to form the plastic material therein into desired shape. Simultaneously with the descent of the plunger a stick is inserted into the edge of the compressed material. The plunger is then withdrawn to complete its cycle and the table rotated, with the stick projecting from the candy, to bring the next die mold cavity into cooperation with the plunger. Final operations, with which this invention is not concerned, eject the stick candy from the molds and deliver it to a drying apparatus. Details of the machine just briefly disclosed form the subject matter for an application for Letters Patent, Serial No. 608,431, filed December 22nd, 1922.

The revolving mold table referred to in this connection has its die mold cavities arranged closely adjacent the periphery thereof, and in communication with each mold cavity is a radially disposed stick groove which has its outermost dimension at the periphery of the table and which is adapted to be moved into register with the discharge end of a stick inserting arrangement. As a result of the operation of the revolving table and stick inserting device, a stick having reached its full position in the candy disc, is still projecting from the periphery of the table where it remains until ejected therefrom. Therefore, it will be clear that following the inserting operation and before the table is rotated to its next position, the projecting end of the stick will remain in the discharge end of the stick inserting arrangement. Following the operation thus far, the stick must move in a circular path out of its guide and over the end of the inserting device, when the table rotates to its next position. In order to make this operation possible the side of the groove facing the direction of movement of the table is open to the depth equalling the projection of the stick beyond the periphery of the table. This opening in the stick groove removes all support from the stick on one side just as it is entering the perpihery of the table and the mass of compressed candy in the mold. If the stick is a bit weak and the compressed candy material at all cooled the force necessary to complete the inserting operation is sufficient to cause the stick to bend and possibly snap along its unsupported length. If the stick is not of sufficient strength to withstand the strain and snaps, the plunger advancing against it will jam the fragments and clog the machine.

Therefore, it is the purpose of the present invention to provide an apparatus of this character with means for lending sufficient support to the stick while it is under pressure and during the projection operation, and, thereafter, to automatically move out of the circular path of the advancing stick as it is moved from the guide groove. I accomplish this purpose by means of the several novel features of construction and combinations of parts hereinafter described in detail and illustratively exemplified in the accompanying drawings, in which—

Figure 2:
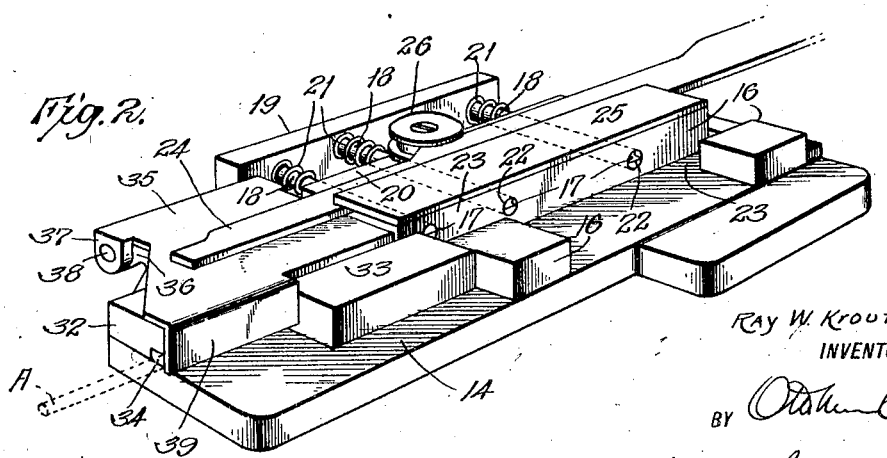

Figure 1 is a plan view of a candy machine having the stick inserting device provided with the movable guide wall; Figure 2 is a perspective view of the delivery end of the stick inserting device and movable guide means; Figure 3 is a cross section taken on the line 3—3 of Figure 1; and Figure 4 is a longitudinal cross section taken on the line 4—4 of Figure 1.

Referring to the drawings, 10 denotes the bed of the candy machine and 11 the intermittently rotated circular table having a plurality of uniformly spaced die mold cavities 12 closely adjacent the periphery thereof. At an elevation of about one half the height of the walls of the cavities 12 and disposed between each cavity and the periphery of the table is a radial groove 13 which receives the incoming stick A and guides the same into the edge of the candy material being compressed in the die molds 12, as previously described. The bed 10 is cut away to conform to one quarter of the circumference of the table 11 and at the rear tangent thereof the bed projects in a straight line towards one side or away from the direction of rotation of the table, as clearly illustrated in Figure 1.

At the point of tangency and disposed perpendicularly thereto is arranged the stick inserting device which receives its support from the bed 10 and which automatically selects, guides and projects the sticks A into the radial grooves 13 leading to the cavities 12. The stick inserting device comprises a base plate 14 having a flat forward nose 15, inclined rearwardly at one side, and adapted to abut the peripheral side of the table 11. The rear portion of the plate is provided with upstanding longitudinally disposed walls 16, the outside wall thereof being composed of two spaced portions. The walls 16 are arranged parallel to each other and spaced apart so as to provide a passage for the stick inserting mechanism. The inner wall 16 is provided with three uniformly spaced lateral bores 17, which accommodate and support one set of ends of a plunger stick feed. The plunger comprises three rods 18, having their free ends projecting through the bores 17 and the opposite ends loosely mounted in an upright wall 19 at the edge of the bed 10. Intermediate the length of the rods 18 and rigidly fastened thereto, and normally held in contact with the inner wall 16 is a plate 20 which is yieldably forced in the direction of the latter wall 16 by a series of springs 21 disposed about the rods 18 between the wall 19 and plate 20. The free end of each rod 18 is tapered to substantially a chisel edge 22 which projects into the space or trough 23 between the parallel walls 16.

Reciprocating motion is imparted to the plate 20 and associated parts by means of a cam plate 24 which consists of a flat narrow strip of metal having one edge straight and guided against the inner wall 16 by an overhanging plate 25 secured to the upper face of the latter wall 16. The opposite edge of the cam plate 24 is stepped up at spaced intervals and is adapted to engage between the flanges of a roller 26 mounted on the plate 20. The rear end of the plate 24 is attached to a block 27 which is slidably mounted on a pair of parallel rods 28 projecting from the rear face of the bed 10. Reciprocating movement is imparted to the block by means of rocker arm 29 which is provided with a slotted opening adjacent its free end to accommodate a bolt 30 projecting from the block 27. Intermediate the rods 28 and on a slightly higher elevation so as to aline with the axis of the trough 23 is a plunger or ram 31 which moves through the trough 23 below the rods 18 to force a stick, released by the latter, outwardly into the groove 13 and candy mold 12. It is thought unnecessary to describe in detail the mechanism and operation of parts which time and impart movement to the rocker arm 29.

It is clear that the walls 16 do not project to the nose 15 of the plate 14, and in the intervening space, i. e. between the ends of the walls 16 and periphery of the table 11 further guiding means is necessary for supporting the stick. The means used comprises a pair of blocks, 32 and 33, the former being the longer and alined with the inner wall 16, while the shorter block 33 is disposed closely adjacent the forward outer wall 16. The blocks at their adjacent lower inside corners are cut to form a channel 34 having one side open beyond the shorter block to allow the stick to be removed therefrom in a broadside path. The channel 34 is alined with the axes of the trough 23 and a groove 13 in the table, and as previously stated the stick, as it is projected, is normally unsupported during its travel through a portion at least of this channel. According to the present invention I provide a member which is automatically operated and provides a wall for the open portion of the channel 34. This operation is accomplished by means of a plate 35 superposed over the block 32 and having one side hinged parallel to the block on a boss 36 integral with the plate 14. Portions of the plate 35 are bent downwardly at right angles to form ears 37 which pivot about a hinge pin 38 in the boss 36. The free end of the plate is substantially wider than the hinged end and at a point corresponding to the forward end of the block 33 and projecting outwardly to the nose of the plate 14, the plate 35 is bent at right angles to form a skirt or wall 39 which when in closed position contacts along its lower end with the plate 14. The plate is forced to take the closed position by the advance position of the cam plate 24 which moves forward and contacts with an inverted V-shaped rib 40 struck up from the upper face of the plate 36 adjacent the inner end thereof. The plate 35 is yieldably supported upon a spring member 41 which tends to normally hold the lip of the wall 39 above the upper wall of the channel 34 so as to permit the stick to travel sidewise out of the channel with the revolving table 11.

A brief description of one stage in the operation of my improved attachment for the stick inserting device is as follows: The rocker arm 29 is in its extreme rearward position and as a consequence the cam plate 24 is withdrawn so as to bring the low section of the cam surface adjacent to the roller 26. This position enables the rods 18 to project their chisel edges across the trough 23 to support the column of sticks in the feed. A stick has already been fed to the trough in the path of the ram 31. The table 11 is then rotated until the next groove 13 is alined with the axis of the trough, whereupon the rocker arm moves forward and with it the cam plate 24 and ram 31. The nose of the cam 24 upon contact with the V-rib 40 causes the plate to drop and close the open side of the channel 34. Simultaneously with the closing of the side of the channel 34 the stick is projected therethrough and into the groove 13 and candy material being compressed in the mold. The rocker arm reaches its maximum forward throw and starts on its return before the table rotates again, so as to allow the nose of the cam plate 24 to ride backward and off of the V-shaped surface on the face of the plate. Simultaneously with the release of the plate 35 the latter swings upwardly to open the side of the channel and allows the stick, which has reached its final position in the candy, to move sidewise in a circular path out of the channel through the open side. Subsequent to the return of the cam plate 24 to its initial position the roller has been pushed sidewise and with it the rods 18, and as a result a second stick has fallen into the trough in front of the ram 31, which has also receded with the cam plate.

What I claim is:—

1. In candy forming machinery, the combination of stick feeding means, comprising means for feeding one stick and supporting the next, inserting means movable with said first means for projecting the stick having been fed into the edge of a compressed section of candy, and means supporting the stick in its longitudinal travel into the candy and movable out of the path of the stick to enable the latter to travel sidewise.

2. In combination, stick feeding means, an intermittently rotating member having a series of die molds to receive candy material, means for guiding a stick from the feeding means into the material in a die mold, and means incorporated in said guide means to move out of the circular path of travel of the stick before movement of the stick with the rotating member.

3. In combination, stick inserting apparatus for stick candy comprising a channel member having a side opening to permit sidewise movement of a stick out of the channel, and means operated by movement of said stick inserting apparatus to close the open side when a stick is being inserted in the candy.

4. In combination, stick inserting apparatus for stick candy, comprising a guide means having a channel to receive a stick, said channel having an open side at the delivery end to permit a stick to travel sidewise out of said guide means, a yieldably mounted plate movable over said open side, and means movable over the plate to close the open side when a stick is being inserted in the candy.

5. In combination, stick inserting apparatus for stick candy, comprising a plunger to project the sticks, a channel member to guide the projecting stick, said member being cut away to expose the channel on one side to allow the sticks to move sidewise from the member, a yieldably supported hinged plate overlying said channel member and having a depending flange to move over the open side of the cutout portion of the channel member, and means movable with said plunger and contacting with the plate to depress the latter and close the open side of the channel.

6. In combination, stick inserting apparatus for stick candy machinery, comprising a plunger to project the sticks, a channel member to guide the projecting sticks, said member being cut away to expose the channel on one side to allow sidewise movement of the sticks out of the channel, a yieldably supported hinged plate disposed over said channel member and having a depending flange to move over the open side of the cut out portion of the channel member, said plate having cam surface on its upper face, and means movable with the stick plunger to contact the said cam surface and force the plate to closed position against the yieldable support.

7. A yieldably supported hinged plate for closing the opening in a guide channel of a stick inserting apparatus for candy machinery, comprising a flat portion provided with bent sections at one end to receive the hinge connection, a straight side, an outwardly inclined side, and a forward side which is provided with a downwardly bent flange projecting from the end of the inclined side to a point substantially one half the width of the forward side, said upper surface of the plate being struck up to form a cam surface, and means projecting from the under surface of the plate to yieldably support the latter.

In testimony whereof I affix my signature.

RAY W. KROUT.